United States Patent [19]

Simeonov et al.

[11] 4,205,998

[45] Jun. 3, 1980

[54] ADMIXTURE FOR OBTAINING RAPID HARDENING PORTLAND CEMENT AND A METHOD BY WHICH IT IS TO BE PERFORMED

[75] Inventors: Yordan T. Simeonov; Mikola B. Djabarov, both of Sofia, Bulgaria

[73] Assignee: Centralna Laboratoria Po Physiko-Chimicheska Mechanika pri Ban, Sofia, Bulgaria

[21] Appl. No.: 916,013

[22] Filed: Jun. 15, 1978

Related U.S. Application Data

[63] Continuation of Ser. No. 751,865, Dec. 17, 1976, abandoned.

[51] Int. Cl.$^2$ ............................................. C04B 7/35
[52] U.S. Cl. ........................................ 106/315; 106/89
[58] Field of Search ............... 166/89, 102, 103, 314, 166/315

[56] References Cited

U.S. PATENT DOCUMENTS

| | | | |
|---|---|---|---|
| 3,666,515 | 5/1972 | Nakagawa | 106/89 |
| 3,775,143 | 11/1973 | Mikhailov et al. | 106/89 |
| 4,076,545 | 2/1978 | Azuma et al. | 106/315 |
| 4,082,561 | 4/1978 | Nakagawa et al. | 106/89 |
| 4,134,773 | 1/1979 | Simeonov et al. | 106/89 |

*Primary Examiner*—James Poer
*Attorney, Agent, or Firm*—E. Janet Berry; Lawrence Rosen

[57] ABSTRACT

Composition for obtaining rapidly hardening portland cement containing calcium sulfate and calcium oxide wherein active di-aluminium trioxide is included in the form of di-aluminium pentahydroxychloride having the weight ratio of $Al_2O_3:CASO_4:CaO$ equal to 1:3.5 to 4.3:1.3 to 1.8.

A method by which the composition is to be utilized, wherein 4 to 8 parts by weight of the composition are mixed with water, and initially introducing the dialuminium pentahydroxychloride. After its dissolution there are added, in succession, the calcium sulfate and the calcium oxide which are stirred and mixed with 100 parts by weight of pure clinker portland cement having a strength not less than 350. With the mixture thus obtained there are mixed cement pastes, cement-sand mortars and concretes.

3 Claims, No Drawings

ADMIXTURE FOR OBTAINING RAPID HARDENING PORTLAND CEMENT AND A METHOD BY WHICH IT IS TO BE PERFORMED

This application is a continuation application of co-pending application Ser. No. 751,865, filed Dec. 17, 1976, entitled "Composition for Obtaining Rapidly Hardening Portland Cement and a Method for Utilizing Same", now abandoned.

This invention relates to an admixture for obtaining rapid hardening portland cement and the method by which it is to be performed, which may be used for accelerated hardening of concrete in monolithic and prefabricated construction.

A number of accelerating admixtures as additions to portland cements are known. These are mainly inorganic salts—chlorides, fluorides, carbonates, sulphates etc., whereas the calcium chloride is mostly used. A general defect of all admixtures is that they do not guarantee the obtaining of rapid hardening cement (RHC) from simple portland cement.

There are also methods for obtaining of RHC, by which the rapid hardening and the increase of strength are achieved through the formation of a large quantity of calcium hydrosilicates and an increased quantity of calcium trisulphoaluminate hydrate (ettringite) in the early stage of hardening. The calcium hydrosilicates are obtained mainly from alite ($C_3S$), due to which its content is 62-70% and above. The ettringite is formed mainly from tricalcium aluminate ($C_3A$) which is 13-15% and above, as well as from gypsum which reaches up to 4% (calculated as $SO_3$). These components are to be found in the RHC at the time of its production. The formation of the calcium hydrosilicates and of the ettringite takes place after mixing the cement with the water.

In order to obtain large quantities of ettringite and calcium hydrosilicate at the very beginning of hardening the raw materials for the production of RHC should be selected with increased activity and stability, and should be ground to great fineness. The clinker from which the cement is perared is baked at high temperature and reduced capacity of the rotary furnaces and is rapidly cooled at a fixed regime. The grinding should achieve fineness up to 5000–7000 $cm^2/g$ and above of specific surface.

Defects of these methods for obtaining RHC are the strict requirements to the initial raw materials and to the temperature regime of the clinker processing. Besides, the necessity of fine grinding requires prolongation of the grinding period and reduces the capacity of the mills. The cements thus produced are of limited durability - about 3 weeks from the date of their production. On the other hand they demonstrate their high strength qualities predominantly with more dry concretes with reduced sand content and with more plastic concretes which are largely used these qualities are lower.

Another serious defect is also this that the acceleration of the hardening of the concretes is insufficient to obtain the strength necessary for unmoulding (about 60% of the concrete brand), which necessitates either steeming or drier concretes with plasticity above 50 seconds which complicates their workability and considerably limits their application.

Another method for obtaining RHC is known, by which a greater part of the faults pointed out have been avoided. Portland cement clinker is used with alite content ($C_3S$) above 50% and tricalcium aluminate ($C_3A$) ranging from 8 to 10%. The gypsum addition is increased to 3.5-4% (gypsum calculates as $SO_3$). The grinding fineness is up to a specific surface 4000-5000 $cm^2/g$ or sieve residium (the sieve with 4900 openings/$cm^2$) about 7%.

The fault of this method is that it requires specific raw materials and composition of the clinker.

The invention aims at avoiding the faults mentioned above by supplying an admixture for obtaining of rapid hardening portland cement and a method by which it is to be performed whereby the strict requirements in respect of raw materials and RHC production technology are lessened.

This problem was solved by the creation of a RHC admixture which is added to water used to mix the cement. The admixture consists of active (soluble) bialuminium trioxide, introduced in the form of bialuminium pentahydrooxidechloride, calcium sulphate in the form of gypsum and calcium oxide in the form of lime.

The bialuminium pentahydrooxidecloride ($Al_2(OH)_5Cl.2.5H_2O$) solves well (over 50%), has high content of active bialuminium trioxide (approximately 46%) and low content of chlorine (about 16%), its water solution has low acid qualities and is not hygroscopic. The gypsum should be ground. Both baked (semihydrated) and raw (Bihydrated) gypsum may be used. Should the latter be used it is necessary for the complex admixture, mixed with water to be used quicker as it begins to thicken in 0.5-1 hour which makes the mixing of the concrete and its workability difficult. It is preferable to use semihydrated gypsum too as no such thickening appears when using it even after a long period of storage and periodic stirring. The lime in the admixture should be ground unslaked or preferably slaked. The weight ratio should be such that the interaction of the components should produce ettringite. The approximate weight ratio of the $Al_2O_3$ to $CaSO_4$ and to $CaO$ is 1:3,5 to 4,3:1,3 to 1.8, the closest to 1:4:1,65 being most preferable.

As a base of RHC ordinary portland cement of brand higher than 350 is taken. The portland cement has to be normal, the content of alite being usually above 40% and it should not contain binding components other than gypsum.

The application method consists in adding 4 to 8 parts by weight of the admixture to water whereby first introducing the bialuminium pentahydroxidechloride and after its solution the calcium sulphate and calcium oxide are added in succession. These are shaken and are further mixed with 100 parts by weight of pure clinker portland cement of brand higher than 350. The mixture so obtained is used to make cement pastes, cement sand mortar and concretes. The ettringite is formed predominantly by solution and not topochemically. It begins as soon as the components of the complex admixture are mixed and results at the very beginning of the cement hardening. The increased quantity of ettringite is due to the admixture components and not to those of the portland cement.

The advantage of the invention is that it expands the raw material base of cement production since the use of selected raw materials of increased activity and stable composition is no more required, nor is it necessary to grind them to a great fineness. It becomes possible to use pure clinker cement of brands 350 and 400 for RHC production. Besides in comparison with most of the known methods the clinker has not to be baked at such high temperatures and reduced capacity of the rotary furnaces nor to be acceleratedly cooled and the cement has not to be ground to such fineness.

The durability of the cement produced after the invention is equal to the ordinary portland cements. The high strength properties of the RHC are attained with drier as well as with more plastic concretes. The strength of unmoulding (about 60% of the project quality of the concrete) is reached during the first day with drier and with more plastic concretes which allowed avoiding of steeming. A significant economic effect can be realised in this way and it expands the usage of RHC.

The invention is better explained with the following Examples:

1. Portland cement of brand 450 was chosen for base of RHC. The mineralogical composition being as follows: $C_3S$-45,8%; $C_2S$-32,4%; $C_3A$-8,1%; $C_4A$-11,0%. The gypsum content was 2,5% (calculated as $SO_3$). The cement is ground to sieve residium 009–4,6%.

Technically pure raw materials were used for the admixture. For 100 parts by weight of portland cement 2 parts by weight of bialuminium pentahydroxidechloride ($Al_2(OH)_5Cl.2,5H_2O$), four parts by weight of gypsum ($CaSO_4.0,5H_2O$) and 2 parts by weight of lime ($Ca(OH)_2$). The weight ratio of $Al_2O_3$:$CaSO_4$:$CaO$ is equal to 1:3,8:1,6.

The weighed quantity of bialuminium pentahydroxidechloride is poured into the water first. At stirring it solves in 10 minutes. Fixed quantities of gypsum and lime are added in succession to the solution. By stirring the components so added a homogenious mixture is obtained. The mixture should be periodically stirred during the storage and before use. Cement sand mortar and concrete are added to the mixture thus prepared.

The cement-sand mortar is made with standard quartz in a weight ratio cement:sand = 1:3. The water cement factor is 0,5. The mixing of the test samples is done in a standard mixer and the compacting is effected also with a standard jolting table. The flow is determined with a conic form and a jolting table.

The experimental results, as arythmetic mean of the tested three prisms with dimensions 4/4/16 cm and 6 half prisms are shown on Table 1. The hardening of the test samples to the predetermined age is effected at storage under water.

Table 1

| Composition | Flexural Strength and Compressive Strength | | |
|---|---|---|---|
| | 1st day kgs/cm² | 3 days kgs/cm² | 28 days kgs/cm² |
| | Flexural Strength | | |
| without admixture | 22,2 | 38,2 | 73,4 |
| with complex admixture | 39,0 | 51,2 | 72,0 |
| | Compressive Strength | | |
| without admixture | 126,5 | 222,0 | 486,8 |
| with complex admixture | 233,5 | 368,1 | 564,4 |

The concrete is prepared with the same cement, sand and gravel the size of which is 5–20 mm. The composition is the usual one for strength 200. On the basis of the production of concrete mixture the following exact composition is calculated for 1 m³: 327 kg cement, 831 kg sand and 1187 kg gravel. The water cement factor is 0,66 and the plasticity of the concrete mixture measured by the compacting of the cone is 1–3 cm. The mixing of the concrete is done by a concrete mixer with forced action and the compacting by vibration. The hardening of the test samples proceeds in the air for some and for others by steeming in 85°–90° C. according to the schedule 1+5+1. The strength indicators are taken on 10 cm cubes, multiplied by coefficient 0,9 in order to transfer them to the standard strength. The results as mean arithmetic values of these test samples are shown on Table 2.

Table 2

| Composition | Compressive Strength of Concrete | | |
|---|---|---|---|
| | Compressive Strength | | |
| | 1 day kgs/cm² | 28 days kgs/cm² | 90 days kgs/cm² |
| Air storage without admixture | 58,5 | 192,5 | 199,2 |
| with complex admixture | 121,8 | 249,7 | 268,2 |
| Steeming without admixture | 160,8 | 205,2 | 207,5 |
| with complex admixture | 226,0 | 286,2 | 347,2 |

The complex admixture increases more than two times the strength of the concrete from the very first day and reaches more than 60% of the project strength of the concrete. This allows avoiding of steeming. The results pertain to ordinary concrete with low consumption of cement, large quantity of sand and of considerable plasticity. By steaming the complex admixture adds to the strength, particularly with the passage of time.

2. The base of RHC represents portland cement with strength 350 having the following mineralogical composition: $C_3S$-50,5%; $C_2S$-22,6%; $C_3A$-8,4%; $C_4A$-11,7%. The gypsum content is 2.86% (calculated as $SO_3$). The cement is ground to fineness with sieve residium 009–11,4%.

The components of the admixture, their content and the method of preparation of the RHC are the same as described in ex. 1. The cement sand mortar has the same composition and method of preparation as in ex. 1.

The experimental results are shown in Table 3.

Table 3

| Composition | Flexural Strength and Compressive Strength | | |
|---|---|---|---|
| | 1 day kgs/cm² | 3 days kgs/cm² | 28 days kgs/cm² |
| | Flexural Strength | | |
| without admixture | 13,8 | 36,8 | 72,4 |
| with complex admixture | 25,4 | 49,4 | 75,2 |
| without admixture | 73,4 | 221,4 | 446,7 |
| with complex admixture | 154,1 | 356,0 | 533,3 |

The investigations show also, that the use of the complex admixture and the method to be performed by considerably reduce water bleeding of the cement. The cement stone practically does not contain uncombined gypsum and it has equal or greater volume stability at storage under water than that of the portland cement without admixture.

What we claim is:

1. A method for production of an additive mixture for rapid hardening of portland cement which comprises dissolving dialuminium pentahydroxychloride in water, adding successively thereto calcium sulfate and calcium oxide in the weight ratios respectively of $Al_2O_3$:$CaSO_4$:$CaO = 1$:3.5 to 4.3:1.3 to 1.8 and thereafter homogenizing the resulting mixture.

2. A method according to claim 1 wherein the calcium sulfate is in the form of semi-hydrated gypsum.

3. A method according to claim 1 wherein calcium oxide is in the form of hydrated lime.

* * * * *